April 14, 1959     D. W. RINEHART     2,882,377
ELECTRICAL RESISTOR METAL COATINGS ON REFRACTORY MATERIALS
Filed Oct. 24, 1951
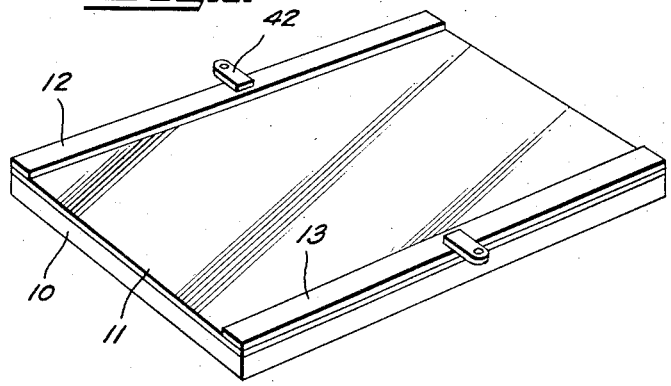
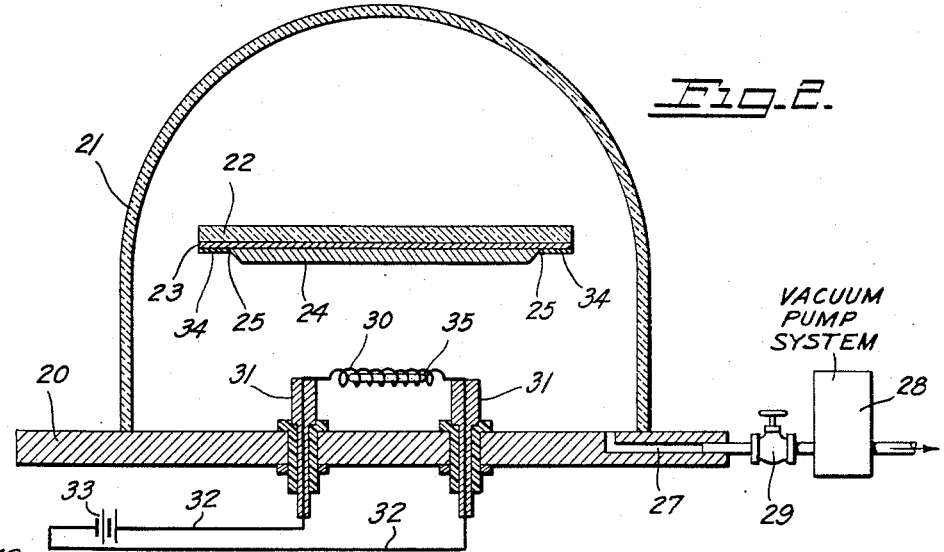
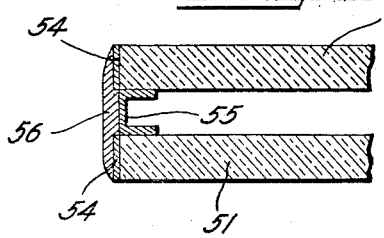
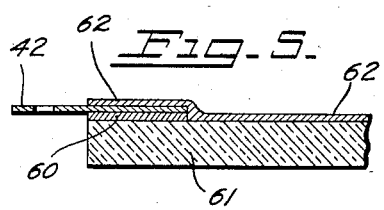
INVENTOR
Dale W. Rinehart
BY Oscar L. Spencer
ATTORNEY United States Patent Office 2,882,377
Patented Apr. 14, 1959

2,882,377

ELECTRICAL RESISTOR METAL COATINGS ON REFRACTORY MATERIALS

Dale W. Rinehart, Brackenridge, Pa., assignor to Pittsburgh Plate Glass Company, Allegheny County, Pa., a corporation of Pennsylvania Application October 24, 1951, Serial No. 252,843

8 Claims. (Cl. 201—73)

This invention is concerned with the production of metal coatings on refractory materials, and more particularly with the production of multi-layer metal bus bars for electroconductive films or coatings upon various articles, particularly upon ceramic, refractory, or vitreous articles such as glass.

The application of electroconductive films or coatings upon glass and similar substances is well known in the art. Such coatings have been applied to glass and other articles so that an electrical potential may be applied across the coating to cause the coating to be heated by the passage of electric currents through the coating. The electroconductive coating may be a thin film or coating on one of the outer surfaces of an article, or may be merely a conductive film between the layers of a laminated article. Articles with electroconductive coatings or films may be used as space heaters, or as viewing closures, or as windows or windshields in all types of vehicles, whereby the conductive film or coating serves to heat the article and radiate heat therefrom, or serves to prevent the accumulation of snow, ice, fog or moisture upon the article. When such electroconductive films or coatings are applied to transparent articles such as windshields, the films or coatings are also substantially transparent.

Electroconductive films or coatings may be applied to ceramic and vitreous materials, such as glass, by heating the base member and exposing it to a mist of a tin salt solution, or by spraying a tin salt solution and a coating aid upon the heated base. Conductive coatings of tin oxide or the like may be transparent or even iridescent and are well known in the art. The method of their application or their composition forms no part of the present invention.

Various problems have arisen in methods and devices used to provide suitable electrical connections for the electroconductive coating or film. Such conductive coatings and films are relatively thin in order that the coating will adhere or bond with the article coated, and in order that the coating will not substantially modify the transparency of the coated article. The application of conductive bus bars or terminals to the edge or marginal portions of thin conductive coatings raises certain problems due to differences in coefficients of expansion, differences in conductivity, and due to damage or breakage of the conductive coating or film adjacent to the applied bus bar.

It is the object of this invention to provide an improved metal bus bar for electroconductive coatings and films.

It is another object of this invention to provide an improved method of applying metal bus bars to articles having electroconductive coatings.

It is a still further object of this invention to provide an improved method of applying metal to vitreous surfaces so as to provide an adherent, tenacious bond between the vitreous surface and the applied metal.

It is a further object of this invention to provide an improved composite bus bar for coated articles without damaging the coating.

It is a still further object of this invention to provide an improved bus bar having uniform and intimate electrical contact with edge portions of electroconductive coatings.

Other objects and advantages of the present invention and the manner by which they are attained will be more fully understood by reference to the ensuing description of methods, apparatus and specific examples.

It is found that metal bus bars may be applied to the marginal portions of electroconductive films and coatings by means of an evaporated metal technique, and various combinations of chromium, nickel, iron, Nichrome, aluminum, Chromel, and rhodium, when so applied adhere tenaciously to these electroconductive films. It is likewise possible to deposit these metals directly upon a ceramic material, such as glass, when it is desired to provide a base for attachment thereto. These metals, when properly applied, are capable of receiving reinforcing layers, as by the application of solder films, or by electroplating, the composite remaining in firm contact. In certain instances, as where a film of chromium is first deposited by evaporation, a top coat of nickel, Nichrome, iron, cobalt or piano wire must be applied to enable good adhesion with soldered electrical connections.

Referring to the accompanying diagrammatic drawings for the purposes of illustration.

Figure 1 is a diagrammatic perspective view of a glass panel suitable for use as a vehicle window or heating panel and having metal bus bars applied to marginal edge portions thereof.

Figure 2 is a diagrammatic sectional view of apparatus for applying the metal bus bar to marginal edge portions of a glass panel by an evaporated metal technique.

Figure 3 is an enlarged diagrammatic sectional view of a bus bar portion of a glass panel coated with electroconductive material.

Figure 4 is an enlarged diagrammatic sectional view of a bus bar portion of a double panel glazing construction.

Figure 5 is an enlarged diagrammatic sectional view of a bus bar portion of a glass panel having the bus bar applied directly to the glass prior to the application of the coating of electroconductive material to the glass and bus bar.

In Figure 1, a glass panel 10 shaped to serve as a vehicle window or windshield is provided in the usual manner with a transparent coating 11 of electroconductive material such as tin oxide. Metal bus bars 12 and 13 are applied to the panel 10 over the coating 11 along opposite sides or edge portions of the panel 10. The bus bars 12 and 13 are disposed along the longest pair of opposite sides of the panel whereby the distance between bus bars is held to a minimum. As is well known in the art, the bus bars 12 and 13 may be connected in series with a switch and source of electricity (not shown) to cause an electrical current to flow through the conductive film or coating 11 to heat the glass panel 10.

The apparatus for applying metal bus bars illustrated diagrammatically in Figure 2 includes a base 20 and a removable covering enclosure 21, such as a bell jar. The flat glass panel 22 having previously been coated on its lower surface with a transparent electroconductive coating or film 23, is supported under the enclosure 21 by any suitable support (not shown). For the application of metal bus bars to marginal edge portions of coating 23, the edge portions may be defined by a mask 24 having knife edges 25, the mask being suitably supported so as to expose marginal portions of the coating 23 along lines parallel to and extending inwardly from the edge of the panel 22. The portion of the coated panel 22 between the opposed knife edges 25 is therefore masked by the panel 24 engaging the major area of the coating 23 to prevent the application of bus bar metal thereto. The mask 24 may be of iron, glass, or other suitable material.

The covering enclosure 21 is sealed to the base 20. A conduit 27 is provided through the base 20 for connection to a vacuum pump system 28 or to other means for exhausting the space between the enclosure 21 and the base 20. A heater 30, in the form of a coil of tungsten wire, is supported on brass contacts on insulating supports 31 extending within the space enclosed by the cover 21 and sealed in the base 20. Additional heaters may be provided where successive coatings are to be applied. Electrical leads 32 extend from said contacts to a source of electrical energy 33. The metal from which the bus bar base coat 34 is to be formed is supported by or in the tungsten coil 30, and may be in the form of a piece of metal 35 around which the tungsten filament 30 is tightly wound. The application of electrical energy to the heater 30, causes the metal 35 to be evaporated, and the metal vapors condense on the marginal or edge portions of the coating 23 of the panel 22 forming metal bus bars 34. Evaporated metal also condenses on other portions of the apparatus such as the interior surface of enclosure 21 and the surface of mask panel 24. The power required to evaporate the bus bar metal 35 and the time of the heating depends on the particular metal applied, the size of the apparatus, and the thickness of bus bar base coat desired. The chamber formed between enclosure 21 and base 20 is evacuated to pressures of the order of $10^{-4}$ mm. Hg before the start of the metal evaporating step, by means of a vacuum pump system 28 connected to the chamber through a cut off valve 29.

In Figure 3, the edge portion of glass panel 22 is shown enlarged with a metal bus bar base 40 applied to the conductive coating 23, by the metal vaporizing apparatus shown in Figure 2. The bus bar base 40 makes tenacious and intimate electrical contact with the coating 23. In order to increase the thickness of the bus bar and thus to improve its ability to conduct the required electric current flow, a tinned copper strip 41 may be sweated or may be soldered by solder 43 to the bus bar base 40. A copper connector lug 42 may be soldered to the strip 41 if desired. Solders such as 50/50 tin-lead solder may be used but other solders have also been found suitable.

Since a single layer metal bus bar base 40 applied by the metal vaporizing technique has a thickness of the order of one or two millionths of an inch, its ability to conduct electrical currents is often insufficient. The bus bar conductance is therefore increased by the deposit of a second coating on the base 40 and/or by the application of a tin-lead solder film of appropriate thickness or by the application of a tin-lead solder film of appropriate thickness or by the application of an auxiliary metal foil strip 41 by sweating or soldering.

In Figure 4, the double panel glazing construction includes spaced glass panels 50 and 51. A metal is evaporated by apparatus such as shown in Figure 2, and caused to condense on the edges of panels 50 and 51 as strips 54. The panels 50 and 51 are separated by a marginal spacer channel member 55, preferably of bronze. A 50/50 tin-lead solder 56 is then applied between the strips 54 and the spacer 55 to seal the panels and form with the strips 54 a metal edging providing a continuous peripheral seal.

In the modification illustrated in Figure 5, a metal bus bar strip 60 is applied directly to the marginal or edge portion of uncoated glass 61, by the evaporated metal technique described above. A connecting lug 42 may then be soldered to a portion of the bus bar 60. The upper surface of the glass 61 and the bus bar strip 60 is then coated with a transparent film 62 of an electroconductive material, such as tin oxide. The evaporated metal strip 60 adheres strongly to the glass 61 and provides good electrical contact with the electroconductive coating applied thereover.

*Example 1*

A metal bus bar was applied to the electroconductive coating on a panel of window glass as follows. Referring to the drawings, the panel of window glass 22 was supported from the base 20 with the electroconductive coating 23 facing downward. A mask 24 having knife edges 25 was supported with its upper surface in contact with the coating 23 and with its edges 25 parallel to and spaced from the edge of the glass panel 22 about three-eighths of an inch. A tungsten filament 30 was supported on insulators 31 and the lead wires 32 extended through the base 20 for connection to a source of electrical energy 33. A piece of chromium 35 was placed in a tightly wound coil of the tungsten filament 30. A bell-shaped enclosure 21 was placed over the above apparatus with the edges of the enclosure making an airtight contact with the base 20. The space under the enclosure 21 was evacuated by a vacuum pump system 28 connected to the passage 27 until the pressure under the enclosure was of the order of $10^{-4}$ millimeters of mercury. Electrical current was then passed through the tungsten filament 30 causing it to heat and vaporize the chromium 35. The vaporized chromium condensed on the coating 23 exposed between the knife edges 25 and the opposite edges of the glass panel 22, as well as on the rest of the apparatus and its enclosure. The strip 34 of chromium deposited on the panel has a thickness of the order of one or two millionths of an inch. By using a separate filament surrounding a piece of nickel, the chromium strip 40 on the coating 23 of glass panel 22, see Figure 3, was then coated with a layer of evaporated nickel 43 having a thickness of the order of one or two millionth of an inch. The nickel layer 43 was then tinned with 50/50 tin-lead solder. A tinned strip 41 of copper foil about .0015 inch thick was then sweated onto the tinned nickel coating 43. Copper connection tabs or lugs 42 were then soldered to the copper foil 41. The copper-covered chromium-nickel bus bar was found to make satisfactory and intimate electrical contact with the electroconductive coating 23 on the glass panel 22, and the electroconductive coating was not damaged, cracked, or separated by the application of the evaporated chromium and nickel or by subsequent tinning and sweating operations.

*Example 2*

The procedure outlined in Example 1 was followed except that instead of chromium, a nickel-chromium alloy, eighty parts nickel and twenty parts chromium, was evaporated. A nickel-chromium bus bar base 34 was deposited. The nickel-chromium strip was coated with a thin coating of 50/50 tin-lead solder and copper tabs were soldered on each end of the bar. The bar was then electroplated with a thin film of copper.

*Example 3*

The procedure outlined in Example 1 was followed except that instead of chromium, aluminum was evaporated. The aluminum deposit 40 formed a strongly adherent bus bar base having a satisfactory area of contact with the conductive coating 23. A coating 43 of iron alloy was deposited on the aluminum before tinning.

*Example 4*

The procedure outlined in Example 1 was followed to deposit a base coat of chromium on the conductive coating 23. Then the chromium evaporation was followed immediately by a second evaporation step in which iron was evaporated to form an iron film deposited on the chromium film. The second coating provides a solderable base for the application of a tin-lead solder or of an auxiliary metal foil strip. It was found that nickel, Nichrome, Chromel, iron, cobalt, or piano wire could be used to form a satisfactory evaporated metal coating on an initial chromium deposit.

*Example 5*

The procedure outlined in Example 1 was followed except that instead of chromium, rhodium was evaporated. A rhodium bus bar base coat was deposited and found to be satisfactory.

*Example 6*

The procedure outlined in Example 1 was followed except that instead of chromium, a chromium-iron alloy was evaporated to deposit a chromium-iron bus bar base coat. It was also found that a multi-layer coating of chromium-iron deposits produced by several successive evaporations of a chromium-iron alloy produced a satisfactory composite metal bus bar having good electrical contact with the conductive coating 23.

*Example 7*

The procedure outlined in Example 1 was followed except that a glass panel 22 without any electroconductive coating 23 was utilized. After application of the evaporated metal directly to marginal portions of the glass, an electroconductive coating 62 was applied to the glass and extending over the bus bar 60, as illustrated in Figure 5.

Tests indicate that evaporated chromium, aluminum or rhodium can be used to provide a satisfactory adherent metal layer or coating on vitreous material and on electroconductive films on such materials. Where electroconductive films are used, the applied metal provides a satisfactory bus bar or bus bar base coat. Tests also indicate that evaporated alloys containing one or more of the above metals, such as Nichrome, Chromel, etc., also can be used to provide a satisfactory metal coat or bus bar. It is also found that the above metals or alloys thereof may be evaporated in successive steps or built up to a satisfactory composite metal coating or bus bar having adequate electrical conductance. Metals such as copper are not suitable to apply by the evaporated metal technique, since copper has poor adhesion to the conventional electroconductive coatings used on glass. Where it is desired to give increased conductance to the evaporated metal strips, a copper ribbon may be soldered to or sweated on the evaporated metal bus bars. Also electroplating or the application of a layer of solder can be used to increase conductance.

Although the present invention has been described with reference to the specific details of certain embodiments thereof, it is not intended that such details shall be regarded as limitations upon the scope of the invention except insofar as included in the accompanying claims.

I claim:

1. An article of manufacture which comprises a glass base, a thin electroconductive coating covering said base, and a metal strip having a composition different from that of the electroconductive coating in intimate electrical contact with a marginal portion only of said electroconductive coating and consisting essentially of an evaporated metal from the group consisting of chromium, nickel, iron, Chromel, Nichrome, aluminum, rhodium and combinations thereof.

2. An article of manufacture which comprises a glass base, a thin electroconductive coating covering said base, and a metal bus bar in the form of a strip in intimate electrical contact with a marginal portion only of said electroconductive coating, said bus bar including a base portion consisting essentially of an evaporated metal from the group consisting of chromium, nickel, iron, Nichrome, Chromel, aluminum, rhodium and combinations thereof, and a coating of tin-lead solder on said base portion.

3. An article of manufacture which comprises a glass base, a thin electroconductive coating covering said base, and a metal bus bar in the form of a strip of evaporated metal in intimate electrical contact with a marginal portion only of said electroconductive coating, said bus bar including a base portion consisting essentially of a metal selected from the group consisting of chromium, Nichrome, Chromel, nickel, iron, aluminum, rhodium, and combinations thereof, and a coating of conductive metal soldered to said base portion.

4. An article of manufacture which comprises a transparent, glass base, a transparent electroconductive metal oxide coating having bonding properties to metals and glass substantially equivalent to those of tin oxide covering said base, and an evaporated metal strip comprising a metal taken from the group consisting of chromium, iron, nickel, Chromel, Nichrome, aluminum, rhodium and combinations thereof tenaciously bonded to a portion only of said metal oxide coating adjacent a margin of said base.

5. The article according to claim 4, wherein the metal oxide coating contains tin oxide.

6. An article of manufacture which comprises a glass base, a thin electroconductive coating on said base, and an evaporated metal strip comprising a base portion consisting essentially of a metal selected from the group consisting of chromium, nickel, iron, Nichrome, aluminum, Chromel, rhodium, and combinations thereof adhering tenaciously to a marginal portion only of the electroconductive film, and a coating for said base portion comprising a metal different from the metal of said base portion and taken from the group consisting of nickel, Nichrome, iron and cobalt.

7. An electroconductive article comprising a glass base, a metal bus bar in the form of a strip of evaporated metal consisting essentially of at least one element from the group consisting of chromium, aluminum, and rhodium, and a thin electroconductive film composed of a material different from that of said metal bus bars and having a marginal portion only in intimate electrical contact with said bus bar, said base providing a support for the bus bar and the film.

8. An electroconductive article comprising a transparent, non-crystalline glass base, a metal bus bar in the form of a strip of evaporated metal consisting essentially of at least one element from the group consisting of chromium, aluminum, and rhodium, and a transparent electroconductive film composed of a material different from that of said metal bus bars and having a marginal portion only in intimate electrical contact with said bus bar, said base providing a support for the bus bar and the film.

References Cited in the file of this patent

UNITED STATES PATENTS

| | | |
|---|---|---|
| 1,388,373 | Richtmyer | Aug. 23, 1921 |
| 1,988,964 | Barrows | Jan. 22, 1935 |
| 2,021,179 | Fox | Nov. 19, 1935 |
| 2,047,351 | Alexander | July 14, 1936 |
| 2,107,784 | Gardner | Feb. 8, 1938 |
| 2,118,795 | Littleton | May 24, 1938 |

(Other references on following page)

UNITED STATES PATENTS

| | | |
|---|---|---|
| 2,229,585 | Osenberg | Jan. 21, 1941 |
| 2,235,680 | Haven et al. | Mar. 18, 1941 |
| 2,281,843 | Jira | May 5, 1942 |
| 2,335,376 | Ballintine et al. | Nov. 30, 1943 |
| 2,363,781 | Ferguson | Nov. 28, 1944 |
| 2,369,350 | Haven | Feb. 13, 1945 |
| 2,388,242 | Arndt | Nov. 6, 1945 |
| 2,402,122 | Bullinger | June 18, 1946 |
| 2,413,604 | Colbert et al. | Dec. 31, 1946 |
| 2,429,420 | McMaster | Oct. 21, 1947 |
| 2,482,178 | Harris | Sept. 20, 1949 |
| 2,497,666 | Gravely | Feb. 14, 1950 |
| 2,502,855 | Kingston | Apr. 4, 1950 |
| 2,524,939 | Stephan et al. | Oct. 10, 1950 |
| 2,557,983 | Linder | June 26, 1951 |
| 2,586,752 | Weber et al. | Feb. 19, 1952 |
| 2,590,557 | Melsheimer | Mar. 25, 1952 |
| 2,614,944 | Lytle | Oct. 21, 1952 |
| 2,648,754 | Lytle | Aug. 11, 1953 |